United States Patent
Frayer et al.

(10) Patent No.: US 10,525,919 B2
(45) Date of Patent: Jan. 7, 2020

(54) VEHICLE EXTERIOR COMPONENTS HAVING DISCONTINUOUS PLATED FEATURES

(71) Applicant: SRG Global Inc., Troy, MI (US)

(72) Inventors: Rob Frayer, Huntington Woods, MI (US); William Doroghazi, Livonia, MI (US); Marlon Dean Anderson, Howell, MI (US)

(73) Assignee: SRG Global Inc., Troy, MI (US)

( * ) Notice: Subject to any disclaimer, the term of this patent is extended or adjusted under 35 U.S.C. 154(b) by 261 days.

(21) Appl. No.: 15/436,331

(22) Filed: Feb. 17, 2017

(65) Prior Publication Data

US 2017/0341609 A1  Nov. 30, 2017

Related U.S. Application Data

(60) Provisional application No. 62/342,452, filed on May 27, 2016.

(51) Int. Cl.
*B60R 19/52* (2006.01)
*B29C 45/16* (2006.01)
(Continued)

(52) U.S. Cl.
CPC .......... *B60R 19/52* (2013.01); *B29C 45/0053* (2013.01); *B29C 45/16* (2013.01);
(Continued)

(58) Field of Classification Search
CPC ..... B60R 19/52; B29C 45/0053; B29C 45/16; C25D 3/06; C25D 3/08; C25D 5/56
(Continued)

(56) References Cited

U.S. PATENT DOCUMENTS 3,591,352 A  7/1971  Kennedy et al.
3,640,789 A  2/1972  Hepfer
(Continued)

FOREIGN PATENT DOCUMENTS

| EP | 0132485 A1 | 2/1985 |
| JP | S59184228 A | 10/1984 |
| JP | 2008290295 A | 12/2008 |
| JP | 2015064287 A | 4/2015 |
| KR | 20120115993 A | 10/2012 |
| WO | 2015054624 A1 | 4/2015 |

OTHER PUBLICATIONS

PCT International Search Report and Written Opinion dated Jul. 18, 2017 for PCT International Application No. PCT/US2017/031713 (10 pages).

*Primary Examiner* — Joseph D. Pape

(57) ABSTRACT

A component for a vehicle comprises two or more first members each formed of a plateable resin and defining a front surface, wherein the front surfaces of the first members (i) are spaced apart from each other such that they appear discontinuous and (ii) collectively correspond to an outer surface of the component, a second member formed of a non-plateable resin and connected to each of the first members and a chrome plating applied to one or more exposed surfaces of each of the first members. A method of manufacturing the component involves utilizing one or more molds and removing a non-plated component comprising the first members and the second member from one of the one or more molds, attaching the non-plated component to a plating rack, such as via a permanent or temporary conductive circuit, and then performing the chrome plating.

22 Claims, 9 Drawing Sheets

(51) Int. Cl.
*B29C 45/00* (2006.01)
*C25D 3/06* (2006.01)
*C25D 3/08* (2006.01)
*C25D 5/56* (2006.01)
*B29L 31/30* (2006.01)
*B29K 55/02* (2006.01)
*B29K 69/00* (2006.01)

(52) U.S. Cl.
CPC ............... *C25D 3/06* (2013.01); *C25D 3/08* (2013.01); *C25D 5/56* (2013.01); *B29C 2045/0079* (2013.01); *B29K 2055/02* (2013.01); *B29K 2069/00* (2013.01); *B29L 2031/30* (2013.01); *B29L 2031/3005* (2013.01); *B60R 2019/525* (2013.01)

(58) Field of Classification Search
USPC ..................................... 296/193.11; 293/115
See application file for complete search history.

(56) References Cited

U.S. PATENT DOCUMENTS

| | | | |
|---|---|---|---|
| 6,673,227 B2 | 1/2004 | Boone | |
| 8,207,261 B2 | 6/2012 | Elia et al. | |
| 9,290,124 B2 | 3/2016 | Pfeil et al. | |
| 2008/0164635 A1* | 7/2008 | Werner | B29C 45/1671 264/255 |
| 2008/0193586 A1* | 8/2008 | Araujo | B29C 45/045 425/576 |
| 2009/0117398 A1 | 5/2009 | Helmstetter et al. | |
| 2009/0239079 A1 | 9/2009 | Wojtaszek et al. | |
| 2012/0156443 A1 | 6/2012 | Reeder | |
| 2012/0225255 A1 | 9/2012 | Reeder | |
| 2012/0235436 A1 | 9/2012 | Sun | |
| 2012/0305406 A1 | 12/2012 | Pereira et al. | |
| 2013/0027252 A1 | 1/2013 | Lin | |

\* cited by examiner

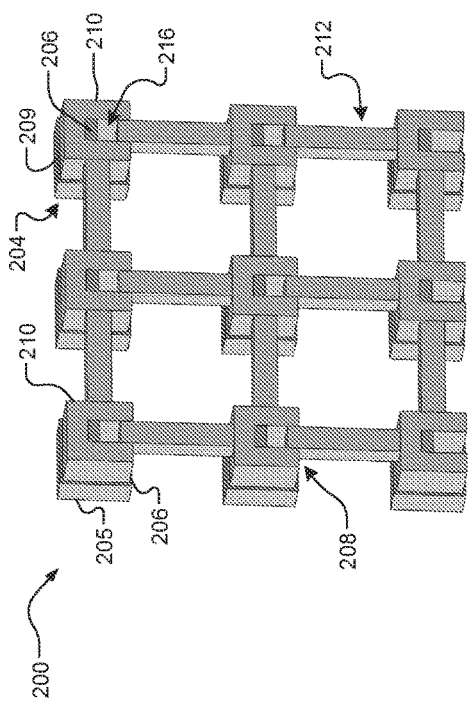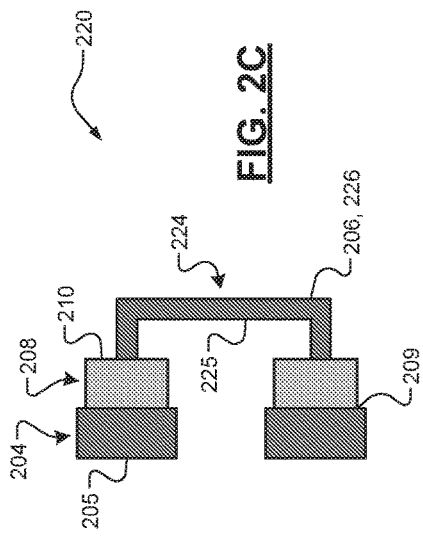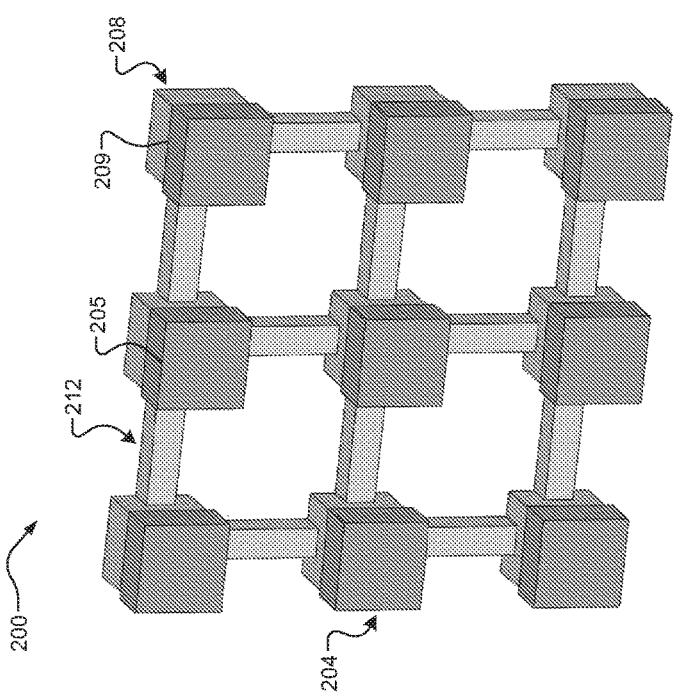

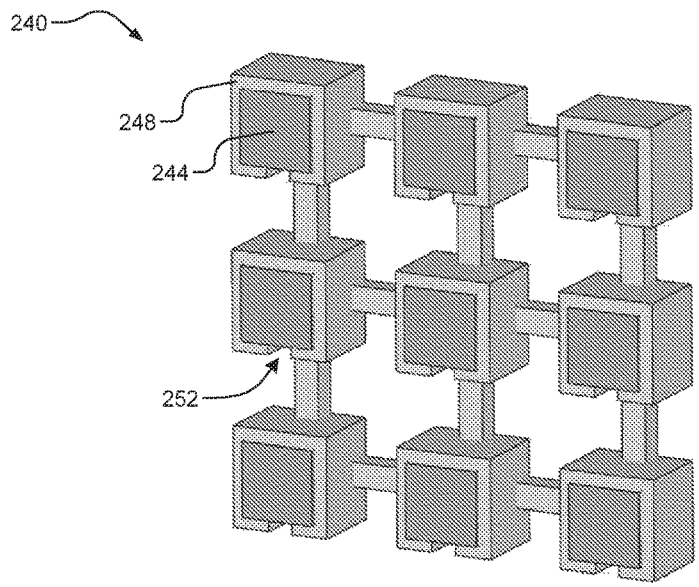
FIG. 2D
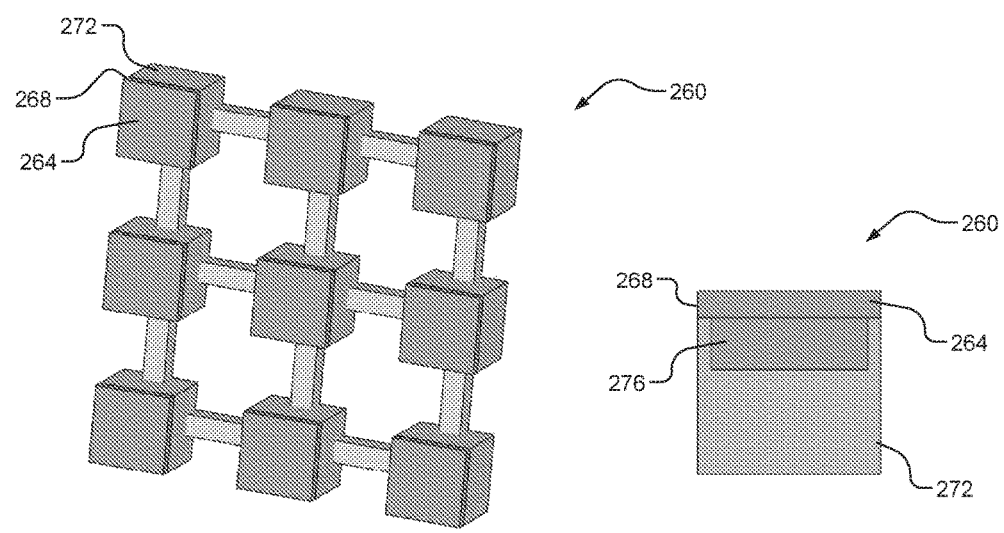
FIG. 2E
FIG. 2F

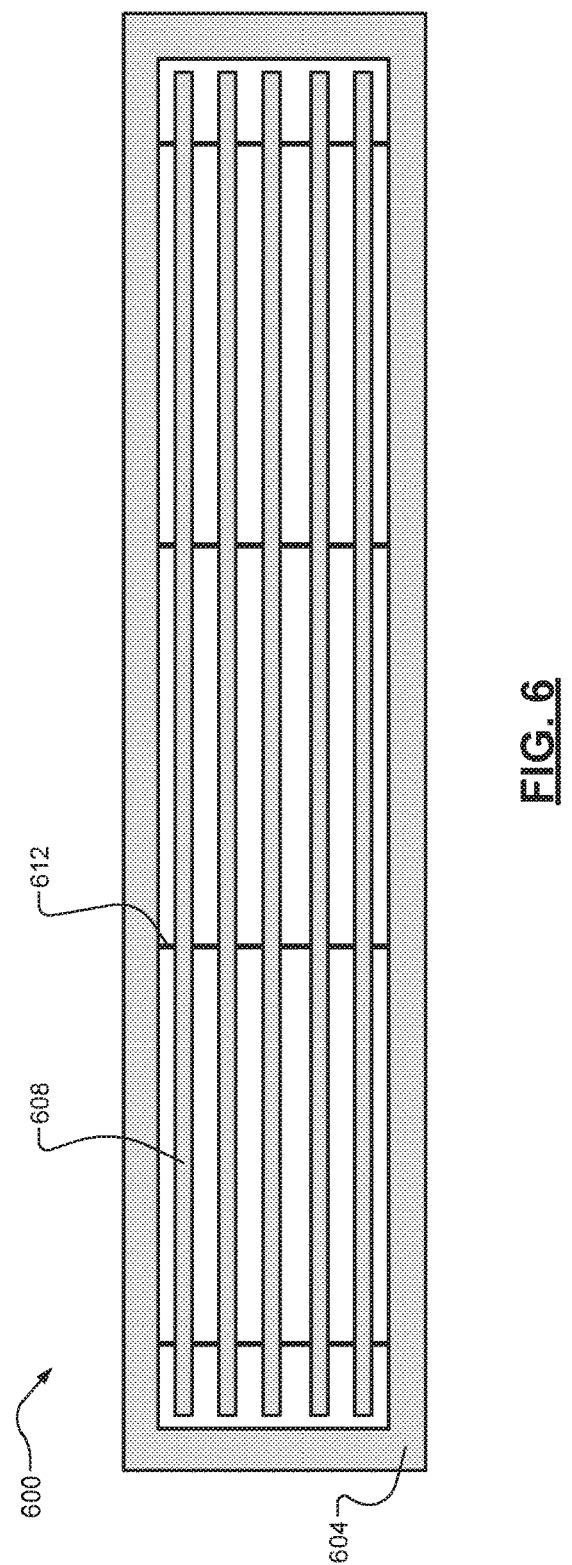

VEHICLE EXTERIOR COMPONENTS HAVING DISCONTINUOUS PLATED FEATURES

CROSS-REFERENCE TO RELATED APPLICATIONS

This application claims the benefit of U.S. Provisional Application No. 62/342,452, filed on May 27, 2016. The entire disclosure of the above application is incorporated herein by reference.

FIELD

The present application generally relates to chrome plating and, more particularly, to vehicle exterior components having discontinuous chrome plated features.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Chrome plating is an electroplating technique where a layer of chromium is plated onto an object. For vehicle applications, exterior components (e.g., a radiator grille) are often chrome plated. In addition to providing functional benefits (corrosion and damage resistance, ease of cleaning, etc.), chrome plating can be used for aesthetic purposes. Achieving certain designs, such as discontinuous or "floating" chrome features, can be difficult because a continuous line of electrical contact is required from the plating surface to a plating rack during the electroplating process.

SUMMARY

According to one aspect of the present disclosure, a component for a vehicle is presented. In one exemplary implementation, the component can include two or more first members each formed of a plateable resin and defining a front surface, wherein the front surfaces of the first members (i) are spaced apart from each other such that they appear discontinuous and (ii) collectively correspond to an outer surface of the component, a second member formed of a non-plateable resin and connected to each of the first members, and a chrome plating applied to one or more exposed surfaces of each of the first members.

In some implementations, at least a portion of the back surfaces of the first members are exposed such that they can be connected to a plating rack to perform the chrome plating. In some implementations, at least a portion of top, bottom, or side surfaces of the first members are exposed such that they can be connected to a plating rack to perform the chrome plating.

In some implementations, the second member defines a front surface that is offset from the front surfaces of the first members. In some implementations, the first members each further define a back surface and the back surfaces of the first members are connected to each other such that they are continuous. In some implementations, the first members each further define a back surface and the back surfaces are spaced apart from each other such that they are discontinuous.

In some implementations, wherein the first members and the second member are formed using a multi-shot injection molding process. In some implementations, the non-plateable resin is polycarbonate. In some implementations, the plateable resin is acrylonitrile butadiene styrene (ABS) or polycarbonate-ABS. In some implementations, the component is an exterior component for the vehicle. In some implementations, wherein the vehicle exterior component is a radiator grille.

According to another aspect of the present disclosure, a method of forming a component is presented. In one exemplary implementation, the method can include molding a plateable resin to form two or more first members each defining a front surface, wherein the front surfaces of the first members (i) are separate from each other such that they appear discontinuous and (ii) collectively form an outer surface of the component, molding a non-plateable resin to form a second member that is connected to each of the first members, removing a non-plated component from a mold, the non-plated component comprising the first members and the second member, and forming the component by chrome plating the non-plated component to apply chrome plating to one or more exposed surfaces of each of the first members.

In some implementations, at least a portion of the back surfaces of the first members are exposed such that they can be connected to a plating rack to perform the chrome plating. In some implementations, the method can further include prior to the chrome plating, attaching a conductive circuit to at least the portion of the back surfaces of the first members, connecting the conductive circuit and the plating rack, and after connecting the conductive circuit and the plating rack, performing the chrome plating. In some implementations, the conductive circuit is a temporary conductive circuit and the method further includes removing the conductive circuit after performing the plating.

In some implementations, molding the non-plateable and plateable resins includes using a multi-shot injection molding process. In some implementations, the non-plateable resin and the plateable resin are each molded in the mold, and wherein the method further comprises rotating the mold approximately 180 degrees (i) after forming one of (a) the first members and (b) the second member and (ii) before forming the other of the first members and the second member. In some implementations, one of the non-plateable resin and the plateable resin is molded in another mold, and the method can further include: inserting the first members or the second member formed in the other mold into the mold and, using the mold, molding the other of the non-plateable resin and the plateable resin to form the other of the first members and the second member.

In some implementations, the non-plateable resin is polycarbonate and the plateable resin is ABS or polycarbonate-ABS. In some implementations, the component is an exterior component for the vehicle. In some implementations, the vehicle exterior component is a radiator grille.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-2G are example configurations of a vehicle exterior component having discontinuous chrome features according to some implementations of the present disclosure;

FIG. 6 is another example vehicle radiator grille having discontinuous chrome features according to some implementations of the present disclosure.

DETAILED DESCRIPTION

Figure 1:
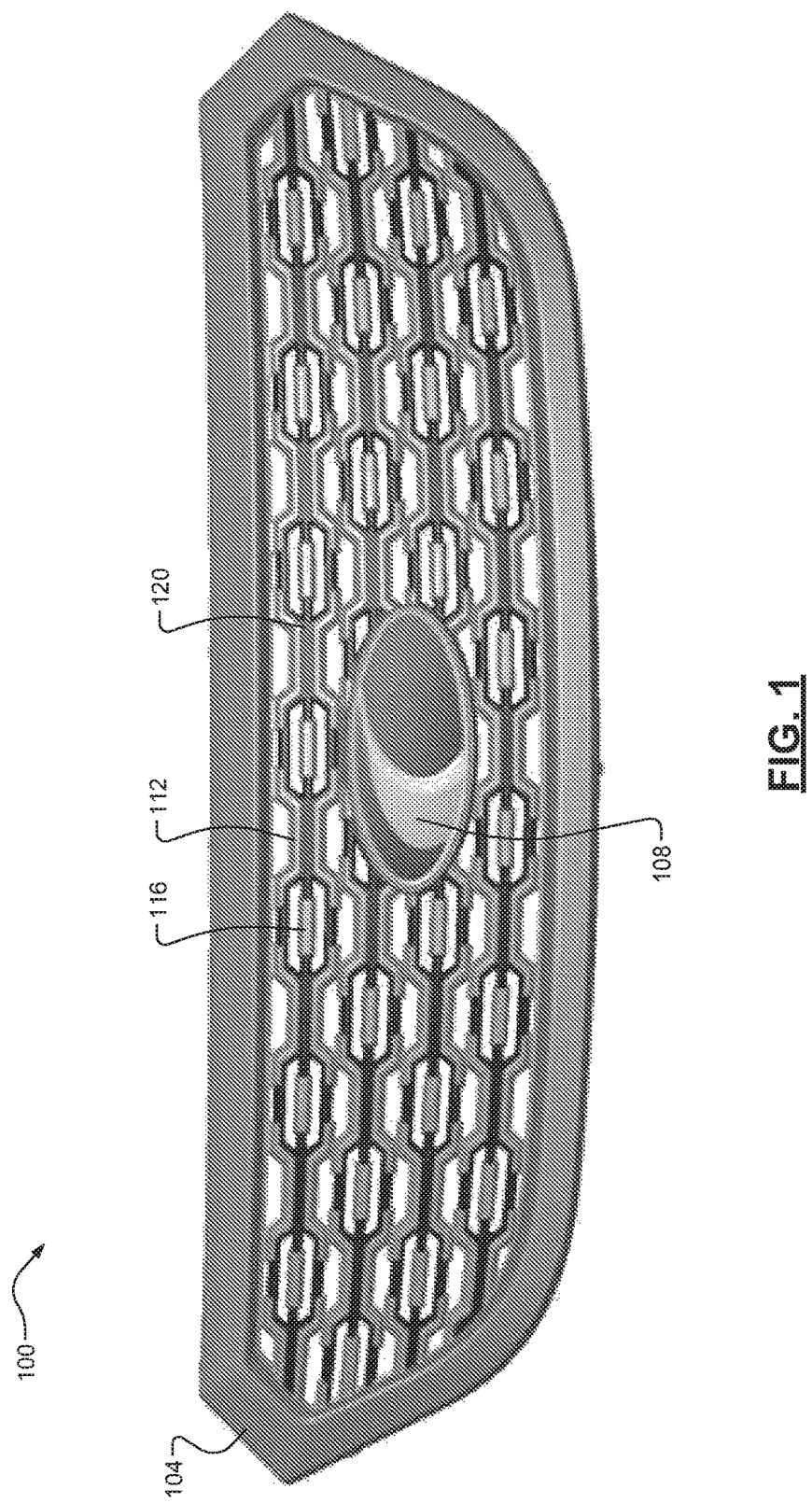
FIG. 1 is an example vehicle radiator grille having discontinuous chrome features according to some implementations of the present disclosure.

As previously mentioned, creating exterior components for vehicles (e.g., radiator grilles) having discontinuous or "floating" chrome features can be difficult because a continuous line of electrical contact is required from the plating surface to a plating rack during the electroplating process. The terms "discontinuous" and "floating" as used herein in conjunction with chrome features refer to the visual appearance of the chrome features with respect to the vehicle exterior component. In other words, each chrome feature appears to be distinct from its neighboring features, although these features may be connected in some manner that cannot easily be seen, such as behind the vehicle exterior component (e.g., the backside of a vehicle front grille). Conventional techniques to achieve such features, such as hot stamping of foil material and application of plate-resistant paint, are very costly and/or time consuming.

Hot stamping of foil, for example, includes applying foil to the desired discontinuous chrome features with a piece of foil material that is larger than the part, with any non-stamped foil material being discarded as waste. The hot stamping foil process is costly due to equipment requirements, part-specific tooling (e.g., a particular design may require multiple dies), and also due to the wasted foil material. Foil also does not meet certain standards for vehicle exterior component applications (e.g., damage resistance, such as stone chip performance). Thus, another costly process may be required to improve performance, such as applying a clear coat paint to the component. Hot stamping of foil can also limit design flexibility. More particularly, all features made using a particular die must share a common pane (e.g., a particular curvature or orientation), depth of designs are limited due to pressure limitations with the process, and there are problems with wrinkles when dealing with complex surfaces that include inside and outside corners.

Applying plate-resistant paint to select parts of the vehicle exterior component can also be very time consuming and costly. This process typically involves molding the part, applying plate-resistant paint with a mask and a paint cell, and then baking the paint to cure it. The part can then be chrome plated. During the chrome plating process, the chrome plating will not adhere to the portions of the part having the plate-resistive paint. The resulting chrome plated part will have the desired selective chrome features, but the plate-resistive paint will remain. Thus, a cosmetic paint is often applied over the plate-resistive paint with a mask and a paint cell after the part is chrome plated because the plate-resistant paint is not visually appealing. The part can then be baked again to cure the cosmetic paint. All of these steps are very time consuming and thereby increase costs due to the increased handling and scrap produced during the process.

Accordingly, an improved vehicle exterior component (e.g., a radiator grille) having discontinuous chrome features and method of manufacturing the exterior component are presented. While vehicle exterior components are specifically discussed herein, it will be appreciated that these configurations and techniques could be utilized to form interior vehicle components and/or exterior/interior plastic components for non-vehicle applications. The exterior component can generally include a first member and a second member formed using multi-shot injection molding process. The first member can be molded from a non-plateable resin, such as a polycarbonate (PC), but it will be appreciated that any non-plateable resin could be used. The second member can be molded from a plateable resin, such as acrylonitrile butadiene styrene (ABS) or polycarbonate-ABS, but it will be appreciated that any plateable resin could be used. The second member both defines a discontinuous or floating feature at a front surface of the exterior component, as well as defines a connective feature such that it can be electrically connected to a plating rack during the chrome plating process. After chrome plating the exterior component, the chrome plated exterior component can have discontinuous chrome features.

Referring now to FIG. 1, an example vehicle radiator grille 100 having discontinuous chrome features is illustrated. As shown, at least some of an outer portion or frame 104 of the grille can be chrome-plated, along with at least some of a central portion or emblem 108. The grille 100 can also include chrome-plated mesh portions 112, 116. While mesh portions 116 are discontinuous and mesh portions 112 are continuous, it will be appreciated that all chrome-plated mesh portions could be discontinuous. It will be also appreciated that these portions 112, 116 could be formed in any desired shape (square, rectangular, circular, diamond-like, hexagonal, etc.).

The terms "discontinuous" and "floating" as used herein refer to separate portions of a single vehicle exterior component that are chrome plated. In other words, the vehicle exterior component may be a single piece (e.g., a single radiator grille assembly), but only these discrete or distinct portions of a very front surface of the component are chrome plated. In other words, these chrome plated portions may not be otherwise connected to each other after the chrome plating is completed. The remainder of the component, e.g., mesh portions 120, could be made, for example, of a non-plated black resin, which could further enhance the appearance of the chrome plated portions appearing as if they are "floating."

In addition, while the chrome plated vehicle exterior component discussed and illustrated herein is typically a radiator grille, i.e., a mesh of a full radiator grille assembly, it will be appreciated that at least some other portions of the full radiator grille assembly could be integrally formed using the same processes herein. For example, radiator grille 100 includes, in addition to mesh portions 112, 116, the frame 104 and the emblem 108. In some implementations, the emblem 108 may be a radome that is designed to allow optimized radar transmission therethrough. In some implementations, the frame 104 and/or the emblem 108 could be formed in a same mold as some of the mesh portions 112, 116. In other implementations, the frame 104 and/or the emblem 108 could be formed in a separate mold, e.g., after forming the mesh portions 112, 116 and inserting them into this separate mold. For example, the frame 104 could be formed primarily of plateable resin such that it can be chrome plated for visual appearance. Similarly, for example, at least a portion of the emblem 108 could be formed of plateable resin such that it can be chrome plated, but some portions of the emblem 108 may be formed of non-plateable resin.

Referring now to FIG. 2A-2B, an example configuration 200 of a vehicle exterior component having discontinuous chrome features 204 is illustrated. Each chrome feature 204 is a second member formed of a plateable resin. Each second member 204 corresponds to a first member 208 formed of a non-plateable resin. As shown, the surface area of each second member 204 is slightly greater than the surface area of its corresponding first member 208, which may enhance the appearance of the chrome features as "floating." The first members 208 can be connected via additional portions 212 of the non-plateable resin, but it will be appreciated that this can collectively be referred to as the first member 208. As can be seen in FIG. 2B, there are recesses 216 in a back portion of the first members 208 where the second members 204 are exposed. This exposed portion of the second members 204 can be connected to a plating rack during the chrome plating of the front surface of the second members 204 to achieve the discontinuous chrome features.

FIG. 2C shows another example configuration 220 where each first member 204 is connected via conductive circuit 224, such as a bridge or a runner formed of the plateable resin. This provides for an easy electrical connection to the plating rack during the chrome plating process. Additionally, this circuit 224 can be removed (e.g., cut off) after chrome plating is complete to achieve a truly discontinuous design where each first member 204 is totally isolated from its counterparts. FIGS. 2D-2F illustrate alternative configurations. In FIG. 2D, a flush configuration 204 is illustrated where a front of the second member 244 is substantially flush with a front of the first member 248. In this configuration, a cutout 252 is provided for electrical connection from the front of the second member 248 to a backside of the members 244, 248 and then to the plating rack. In FIG. 2E, another configuration 260 is shown where, in contrast to FIGS. 2A-2B, the surface area of the second member 264 is approximately the same as its corresponding first member 272. Each second member 264 also defines a shallower depth 268 compared to FIGS. 2A-2B. In this configuration, however, the second member 264 further defines a recessed portion 276 of the plateable resin within the first member 272.

Any suitable conductive circuit 224 or electrical connection could be provided, such as a permanent or temporary connection out a backside of the first member 272. Examples could include an overmolded metal pin that could connect to a fixture or directly to the plating rack or a circuit that could permanently (e.g., conductive ink) or temporarily (e.g., a bridge or runner) be added to the backside of the first member 272 with an electrical connection to an exposed surface of the second member 264. Examples of the connections in these molded interconnect devices (MIDs) include an additional conductive component, a printed conductive circuit (conductive ink, three-dimensional (3D) printed ABS, etc.), a conductive epoxy, and a laser-activated material. The example connective features could be alternatives to the designs shown in FIGS. 2A-2F and discussed above or could be added thereto.

Figure 2G:
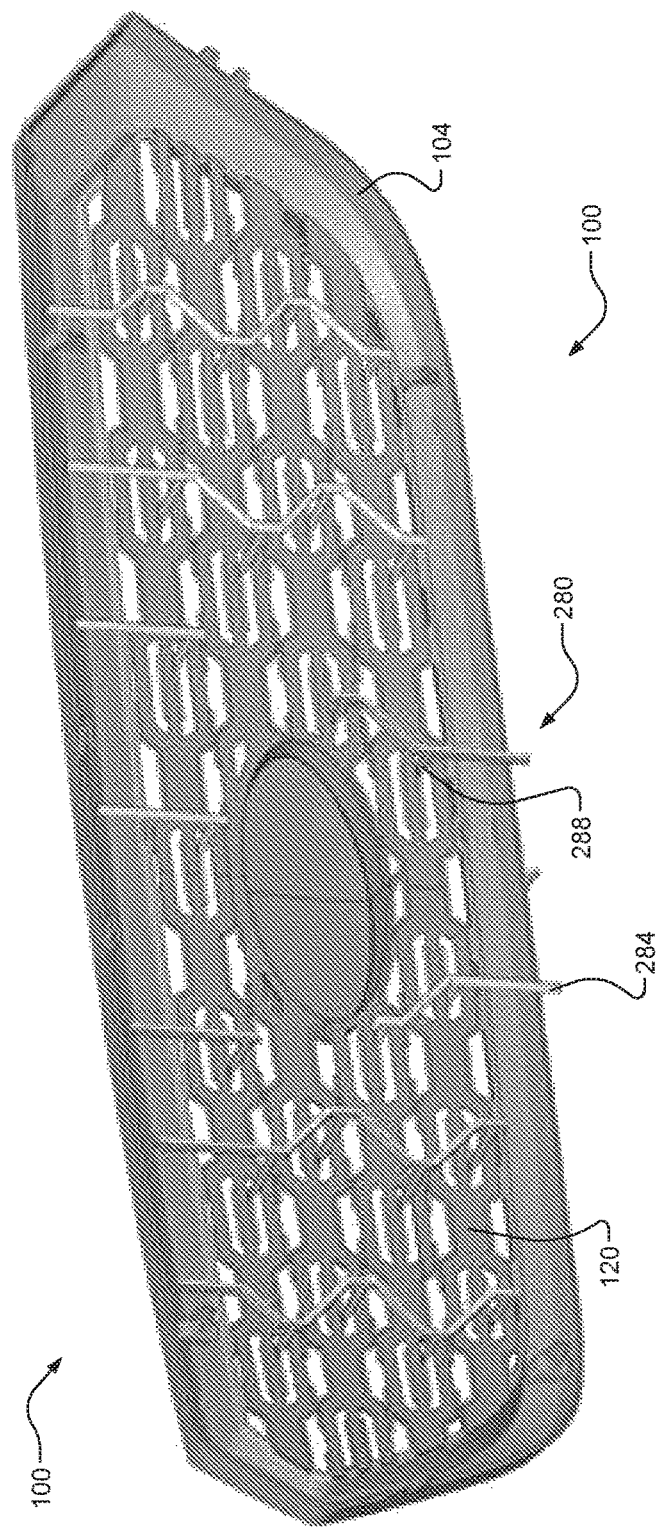

FIG. 2G, for example, illustrates yet another example backside conductive circuit configuration. In this embodiment, the circuit 280 is illustrated with respect to the grille 100 of FIG. 1. The circuit 280 includes vertical connectors 284 that each attach to multiple horizontal connectors 288. These horizontal connectors 288 then connect to an exposed surface of the discontinuous plated mesh portions 116. While not shown, it will be appreciated that the circuit 280 could further include connectors 284, 288 for the other plated portions of the grille 100 (continuous plated mesh portions 112, the frame 104, the emblem 108, etc.). A current can then be applied via this circuit 280 during chrome plating. The backside circuit 280 could then remain or could be removed after chrome plating is complete.

Figure 3A:
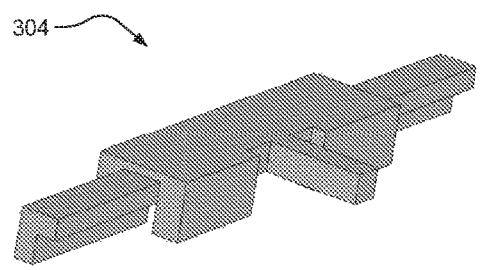
FIGS. 3A-3G are views of other example configurations of a vehicle exterior component having discontinuous chrome features according to some implementations of the present disclosure.
Figure 3B:
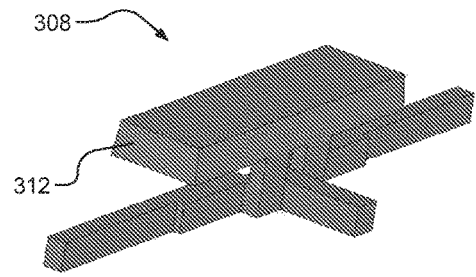
Figure 3C:
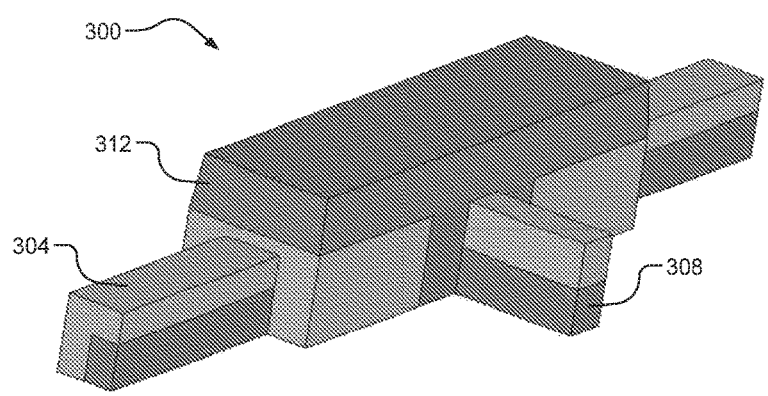
Figure 3D:
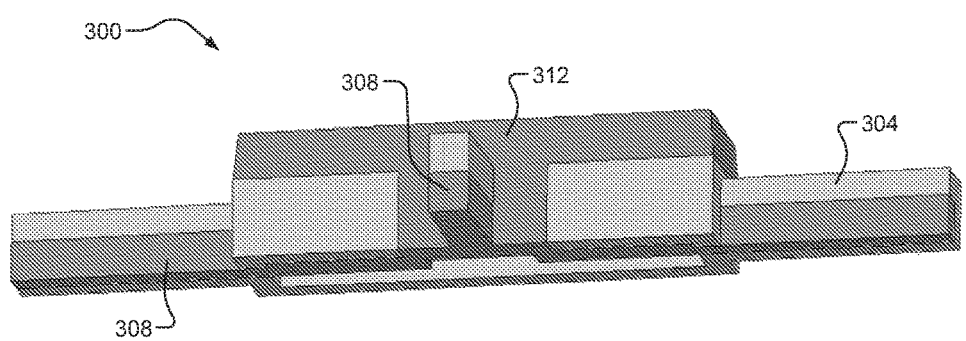

Referring now to FIGS. 3A-3D, example views of an example configuration of a portion 300 of a vehicle exterior component having discontinuous chrome features is illustrated. A first member 304 molded from a non-plateable resin and a second member 308 molded from a plateable resin are shown separately in FIGS. 3A and 3B, respectively. When mated, the vehicle exterior component 300 is formed. As can be seen in FIGS. 3C-3D, the second member 308 (i.e., the plateable resin) is also present at a backside of the component 300, which enables the component to be chrome plated on a front portion 312. This front portion 312 of the second member 308 represents the floating feature, which in this case is a rectangular shape. It will be appreciated that any other shapes and curvatures can be achieved using the techniques of the present disclosure, which makes them preferable to other techniques (e.g., hot stamping of foil) that are limited in their design flexibility. By interconnecting a plurality of these components, a full vehicle exterior component could be formed, such as a radiator grille having a plurality of these discontinuous or floating chrome rectangular-shaped features.

Figure 3E:
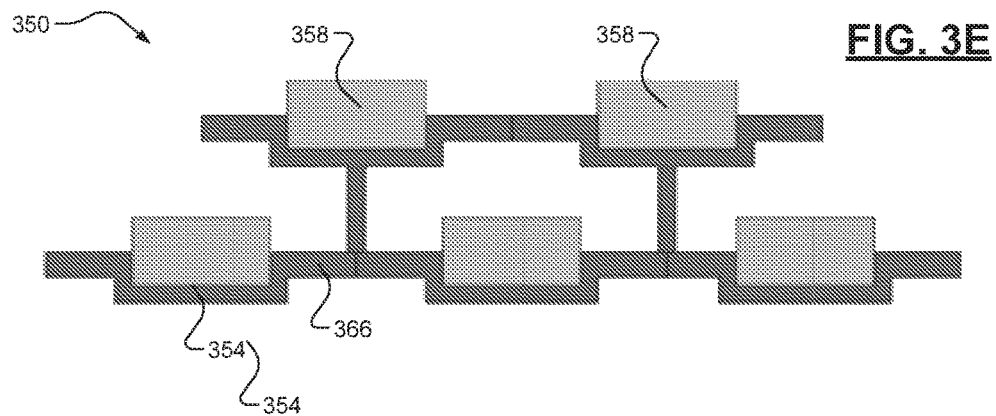
Figure 3F:
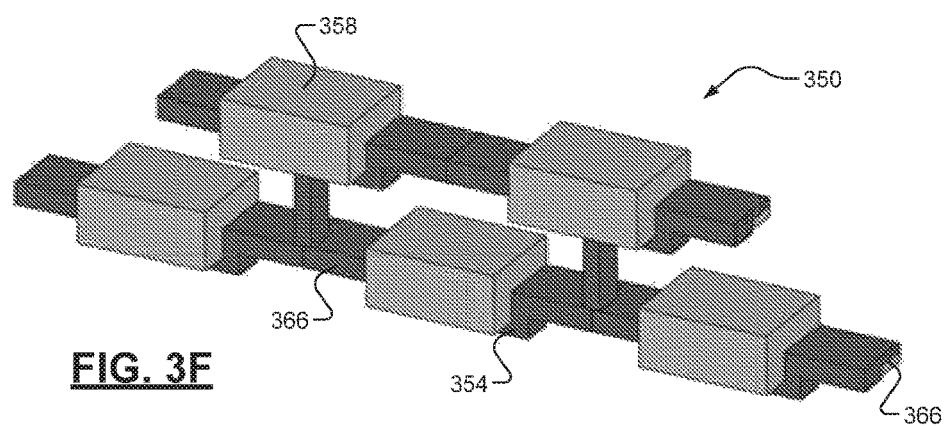
Figure 3G:
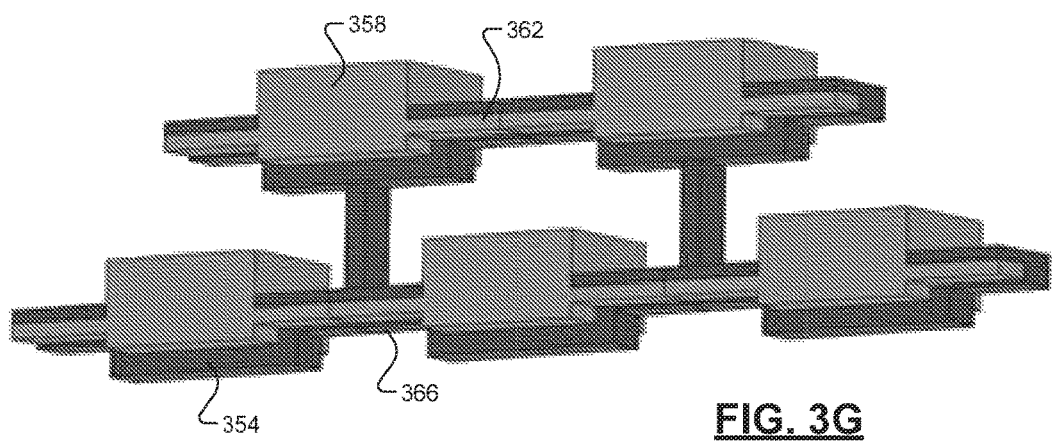

Referring now to FIGS. 3E-3G, example views of another example configuration of a portion 350 of a vehicle exterior component having discontinuous chrome features is illustrated. As can be seen in the front view of FIG. 3E, first members 354 formed of non-plateable resin are continuous and second members 358 formed of plateable resin appear discontinuous. However, as can be seen in the front-side and back-side isometric views of FIGS. 3F and 3G, some of the second members 358 are connected to each other via connective portions 362 that are also formed of plateable resin. Thus, both the second members 358 and their connective portions 362 are fully chrome plated (i.e., not just a front surface of the second members 358). Connective portions 366 of the first members 354, however, hide the connective portions 362 of the second members 358 when viewing from the front.

Figure 4:
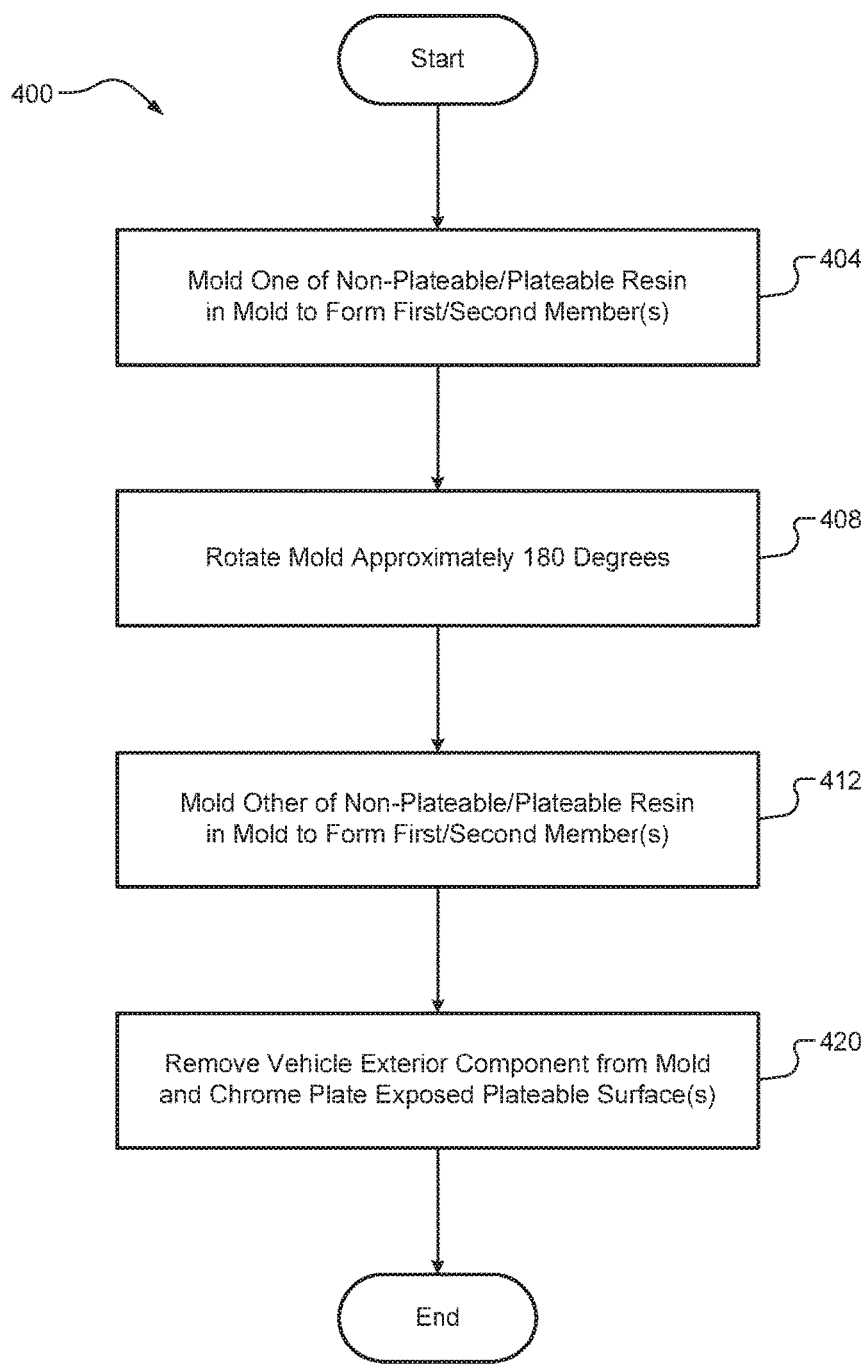
FIG. 4 is a flow diagram of a first example method of manufacturing a component for a vehicle according to some implementations of the present disclosure.

Referring now to FIG. 4, a first method 400 of manufacturing a component for a vehicle is illustrated. At 404, a non-plateable resin can be molded in a mold to form a first member. At 408, the mold can be rotated approximately 180 degrees. At 412, a plateable resin can be molded in the mold to form the second member. It will be appreciated that the order of these molding steps can be reversed, i.e., the second member (plateable resin) could be formed first at 404, the mold could be rotated at 408, and the first member (non-plateable resin) could then be formed at 412. The collective structure in the mold represents a non-plated component (i.e., the mated first and second members). This mating can include the first and second members being chemically bonded or fused together as a result of the injection molding process. At 416, the non-plated component can be removed from the mold and can be chrome plated to achieve the component having discontinuous chrome features. The chrome plating process can be any suitable chrome plating process, such as a hexavalent chromium plating process, a hexavalent free (hex-free) chromium plating process, or a trivalent chromium (tri-chrome) plating process. This generally involves the portion of the second members that are to be chrome plated being dipped into a solution with the opposing portions of the second members being electrically connected to a plating rack. The first method 400 can then end or return to 404.

Figure 5:
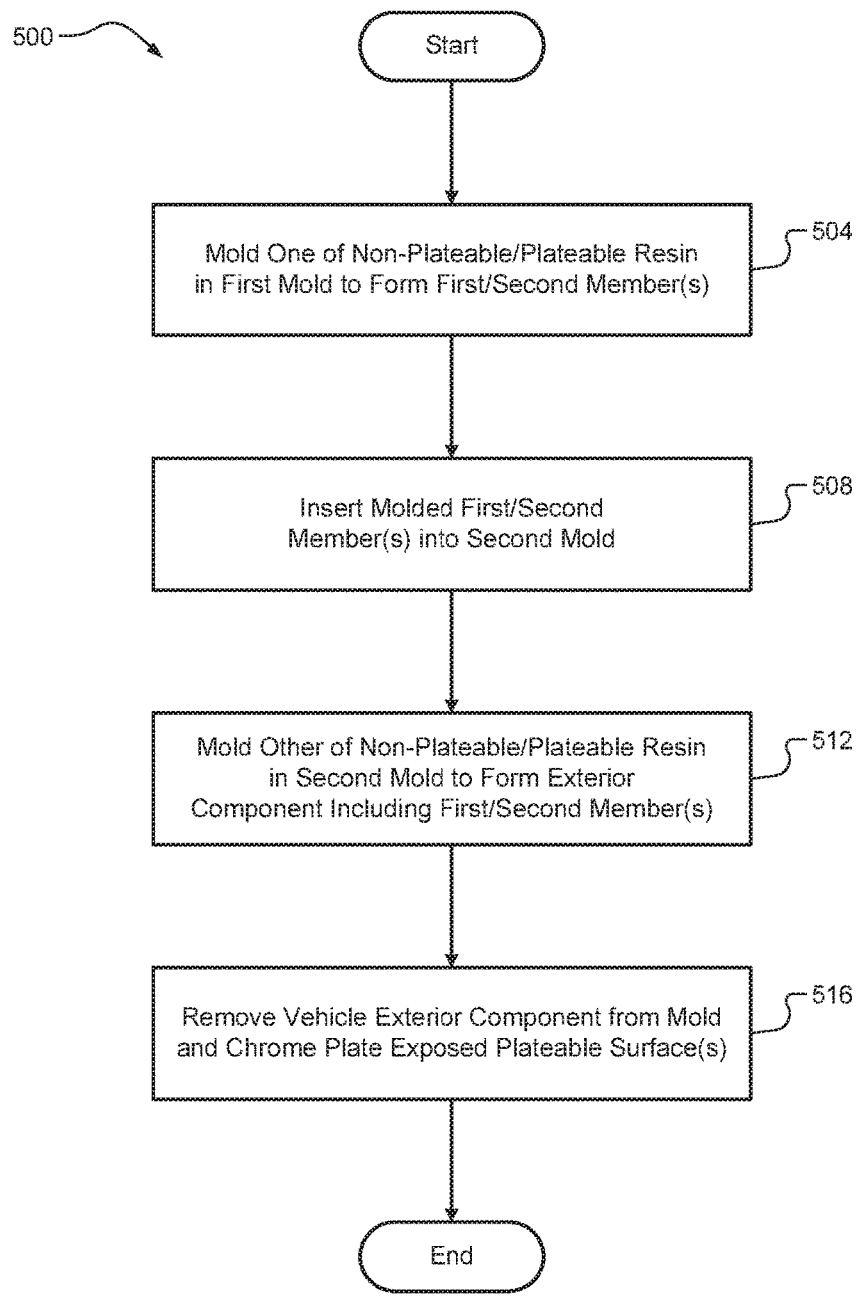
FIG. 5 is a flow diagram of a second example method of manufacturing a component for a vehicle according to some implementations of the present disclosure.

Referring now to FIG. 5, a second method 500 of manufacturing a component for a vehicle is illustrated. At 504, a non-plateable resin can be molded in a first mold to form a first member. At 508, the first member can be inserted into a different second mold. At 512, a plateable resin can be overmolded (i.e., over the first member) in the second mold to form a second member. Again, it will be appreciated that the order of these molding steps can be reversed, i.e., the second member (plateable resin) could be formed in the first mold at 504, the second member could be inserted into the second mold at 508, and the first member (non-plateable resin) could then be overmolded in the second mold at 512. The collective structure in the second mold represents a non-plated component (i.e., the mated first and second members). This mating can include the first and second members being chemically bonded or fused together as a result of the injection molding process. At 516, the non-plated component can be removed from the second mold and can be chrome plated to achieve the component having discontinuous chrome features. The second method 500 can then end or return to 504.

As previously discussed herein, it will be appreciated that the multi-shot injection molding process could involve more than two injections. For example, FIG. 4 and its description above relate to a two-shot process in which the non-plateable resin (e.g., PC) is formed first and the mold is then rotated approximately 180 degrees prior to forming the plateable resin (e.g., ABS). In another implementation, a three-shot injection molding process could be utilized in which the plateable resin (e.g., ABS) is first formed, the mold is rotated approximately 120 degrees, the non-plateable resin (e.g., PC) is then formed, the mold is then again rotated approximately 120 degrees, more plateable resin (e.g., ABS) is then again formed (e.g., overmolded), and the mold is finally rotated approximately 120 more degrees before removing the component therefrom. The type of each shot (e.g., plateable vs. non-plateable) and their ordering can vary, for example, based on a design of the component. For example only, the first shot in this three-shot injection molding process could be to form the conductive circuit, the second shot could be to form the non-plateable portions (e.g., a non-plated portion of the grille mesh), and the third shot could be to form the other plateable portions (e.g., a portion of the grille mesh). Alternatively, for example only, the first and third shots could be switched such that the plateable portions other than the conductive circuit are initially formed (e.g., the plateable portion of the grille mesh), followed by the non-plateable portion (e.g., the non-plateable portion of the grille mesh), and lastly the conductive circuit in the third and final shot.

Referring now to FIG. 6, another example vehicle radiator grille 600 having discontinuous chrome features is illustrated. As shown, the grille 600 includes an outer portion or housing 604, which may or may not be chrome plated. The grille 600 further includes a plurality of (e.g., five) horizontal grille bars 608 that are each formed of a plateable resin (e.g., ABS) and are chrome plated. These bars 608 can be described as being discontinuous or floating because they are distinct from each other. These bars 608 also may or may not be attached at their ends to the housing 604. The grille 600 can further include a plurality of (e.g., four) vertical support bars 612 that are each formed of a non-plateable resin (e.g., PC). While this specific plated mutli-bar and non-plated multi-support configuration is shown and discussed herein, it will be appreciated that any plated single or multi-bar grille configuration could be formed using the techniques discussed herein (e.g., one or more vertical chrome plated bars with one or more horizontal non-plated support bars).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A chrome plated grille assembly for a vehicle, the grille assembly comprising:
   a plurality of first members arranged spaced apart from each other in an array such that they appear discontinuous, wherein each first member is formed by molding a plateable resin and each first member defines a front surface having a shape, and wherein the front surfaces of the first members collectively define at least a portion of an outer A-surface of the grille assembly;
   a plurality of second members each formed by molding a non-plateable resin and each being connected to at least one of a top surface, a bottom surface, a side surface, and a back surface of at least two of the first members; and
   a chrome plating applied to one or more exposed surfaces of each of the first members.

2. The grille assembly of claim 1, wherein a visible size of each second member is substantially smaller than a size of each first member.

3. The grille assembly of claim 2, wherein a visible surface area of the front surface of each first member is substantially larger than a visible surface area of a front surface of each second member.

4. The grille assembly of claim 2, wherein a vertical thickness of a visible portion of each first member is substantially larger than a vertical thickness of a visible portion of each second member.

5. The grille assembly of claim 1, wherein at least a portion of the back surfaces of the first members are exposed such that they can be connected to a plating rack to perform the chrome plating.

6. The grille assembly of claim 1, wherein at least a portion of the top, bottom, or side surfaces of the first members are exposed such that they can be connected to a plating rack to perform the chrome plating.

7. The grille assembly of claim 5, wherein the second members each define a front surface that is offset from the front surfaces of the first members.

8. The grille assembly of claim 7, wherein back surfaces of the second members collectively define an inner B-surface of the grille assembly.

9. The grille assembly of claim 1, wherein the first members and the second members are formed using a multi-shot injection molding process.

10. The grille assembly of claim 1, wherein the non-plateable resin is polycarbonate, and wherein the plateable resin is acrylonitrile butadiene styrene (ABS) or polycarbonate-ABS.

11. The grille assembly of claim 1, wherein the shape of the front surfaces of the first members is one of square, rectangular, diamond, and elliptical.

12. A method of forming a chrome plated grille assembly for a vehicle, the method comprising:
   molding a plateable resin to form a plurality of first members spaced apart from each other in an array such that they appear discontinuous, wherein each first member defines a front surface having a shape, and wherein the front surfaces of the first members collectively define at least a portion of an outer A-surface of the grille assembly;
   molding a non-plateable resin to form a plurality of second members each being connected to at least one of a top surface, a bottom surface, a side surface, and a back surface of at least two of the first members;
   removing a non-plated grille assembly from a mold, the non-plated component comprising the first members and the second members; and
   forming the grille assembly by chrome plating the non-plated grille assembly to apply chrome plating to one or more exposed surfaces of each of the first members.

13. The method of claim 12, wherein a visible size of each second member is substantially smaller than a visible size of each first member.

14. The method of claim 13, wherein a visible surface area of the front surface of each first member is substantially larger than a visible surface area of a front surface of each second member.

15. The method of claim 13, wherein a vertical thickness of a visible portion of each first member is substantially larger than a vertical thickness of a visible portion of each second member.

16. The method of claim 12, wherein at least a portion of the back surfaces of the first members are exposed such that they can be connected to a plating rack to perform the chrome plating.

17. The method of claim 12, wherein at least a portion of the top, bottom, or side surfaces of the first members are exposed such that they can be connected to a plating rack to perform the chrome plating.

18. The method of claim 16, wherein the second members each define a front surface that is offset from the front surfaces of the first members.

19. The method of claim 18, wherein back surfaces of the second members collectively define an inner B-surface of the grille assembly.

20. The method of claim 12, wherein the first members and the second members are formed using a multi-shot injection molding process.

21. The method of claim 12, wherein the non-plateable resin is polycarbonate, and wherein the plateable resin is acrylonitrile butadiene styrene (ABS) or polycarbonate-ABS.

22. The method of claim 12, wherein the shape of the front surfaces of the first members is one of square, rectangular, diamond, and elliptical.

* * * * *